US011623125B2

United States Patent
Sasaki et al.

(10) Patent No.: US 11,623,125 B2
(45) Date of Patent: Apr. 11, 2023

(54) ROTATION ESTIMATION DEVICE, ROTATION ESTIMATION METHOD, RECORDING MEDIUM STORED WITH ROTATION ESTIMATION PROGRAM, TRAJECTORY PREDICTION DEVICE, TRAJECTORY PREDICTION METHOD, RECORDING MEDIUM STORED WITH TRAJECTORY PREDICTION PROGRAM, AND BALL-RETURNING ROBOT

(71) Applicant: OMRON Corporation, Kyoto (JP)

(72) Inventors: Yuki Sasaki, Kizugawa (JP); Masamune Nakayama, Kizugawa (JP); Kyohei Asai, Kyotanabe (JP); Satoshi Yase, Nara (JP); Masayuki Koizumi, Cambridge, MA (US)

(73) Assignee: OMRON CORPORATION, Kyoto (JP)

( * ) Notice: Subject to any disclaimer, the term of this patent is extended or adjusted under 35 U.S.C. 154(b) by 4 days.

(21) Appl. No.: 17/196,052

(22) Filed: Mar. 9, 2021

(65) Prior Publication Data
US 2021/0283485 A1 Sep. 16, 2021

(30) Foreign Application Priority Data

Mar. 13, 2020 (JP) .............................. JP2020-044283

(51) Int. Cl.
*A63B 69/40* (2006.01)
*A63B 24/00* (2006.01)
*A63B 102/16* (2015.01)
*A63B 67/04* (2006.01)

(52) U.S. Cl.
CPC .......... *A63B 69/40* (2013.01); *A63B 24/0021* (2013.01); *A63B 67/04* (2013.01); *A63B 2024/0034* (2013.01); *A63B 2102/16* (2015.10); *A63B 2220/05* (2013.01); *A63B 2220/13* (2013.01); *A63B 2220/35* (2013.01); *A63B 2220/807* (2013.01)

(58) Field of Classification Search
CPC ..... A63B 69/40; A63B 2102/16; A63B 67/04; A63B 2024/0034; A63B 2220/05; A63B 2220/13; A63B 2220/35; A63B 2220/807
See application file for complete search history.

(56) References Cited

U.S. PATENT DOCUMENTS 5,935,023 A * 8/1999 Maehara ............ A63B 37/0017
473/384

OTHER PUBLICATIONS

Akira Nakashima, Takeshi Okamoto, Yoshikazu Hayakawa, "An Online Estimation of Rotational Velocity of Flying Ball Via Aerodynamics," Nagoya University (Aug. 2014).
Junko Nonomura, Akira Nakashima, Yoshikazu Hayakawa, "Analysis of Effects of Rebounds and Aerodynamics for Trajectory of Table Tennis Ball," Nagoya University (Aug. 2010).
Zhao et al., "Optimal State Estimation of Spinning Ping-Pong Ball Using Continuous Motion Model," IEEE Transactions on Instrumentation and Measurement, IEEE Service Center, 64 (8): 2208-2216 (2015).

(Continued)

*Primary Examiner* — Reginald A Renwick
(74) *Attorney, Agent, or Firm* — Morgan, Lewis & Bockius LLP

(57) ABSTRACT

The present disclosure provides a rotation estimation device including an acquisition section and a rotation estimation section.

6 Claims, 12 Drawing Sheets

(56) References Cited

OTHER PUBLICATIONS

Nakashima et al., "An online trajectory planning of struck ball with spin by table tennis robot," IEEE/ASME International Conference on Advanced Intelligent Mechatronics, IEEE, 865-870 (2014).
Extended European Search Report issued in corresponding European Patent Application No. 21161456.5 dated Aug. 18, 2021.

* cited by examiner

ROTATION ESTIMATION DEVICE, ROTATION ESTIMATION METHOD, RECORDING MEDIUM STORED WITH ROTATION ESTIMATION PROGRAM, TRAJECTORY PREDICTION DEVICE, TRAJECTORY PREDICTION METHOD, RECORDING MEDIUM STORED WITH TRAJECTORY PREDICTION PROGRAM, AND BALL-RETURNING ROBOT

CROSS-REFERENCE TO RELATED APPLICATION

This application is based on and claims the benefit of priority of the prior Japanese Patent Application No. 2020-044283, filed on Mar. 13, 2020, the entire contents of which are incorporated herein by reference.

BACKGROUND

Technical Field

Technology disclosed herein relates to a rotation estimation device, a rotation estimation method, a rotation estimation program, a trajectory prediction device, a trajectory prediction method, a trajectory prediction program, and a ball-returning robot.

Related Art

Non-Patent Document 1 discloses a method for estimating a rotational velocity, a rotational position, and a translational velocity of an airborne ball in a table tennis system. In this method, a trajectory of the ball is measured using a medium-speed camera and aerodynamic modeling is performed.

Non-Patent Document 2 discloses a method for analyzing the effects of rebound and aerodynamics on trajectory in table tennis.

Non-Patent Document 1: An Online Estimation of Rotational Velocity of Flying Ball via Aerodynamics, Akira Nakashima, Takeshi Okamoto, Yoshikazu Hayakawa, Nagoya University, August 2014

Non-Patent Document 2: Analysis of Effects of Rebounds and Aerodynamics for Trajectory of Table Tennis Ball, Junko Nonomura, Akira Nakashima, Yoshikazu Hayakawa, Nagoya University, August 2010

Technical Problem

However, in the technology of Non-Patent Documents 1 and 2, the rotational velocity of the ball is measured directly, for example by employing a high-speed camera and printing a black dot on the ball, and it is difficult to predict the trajectory of the ball with good precision using a simple configuration.

SUMMARY

In consideration of the above circumstances, an object of technology disclosed herein is to provide a rotation estimation device, a rotation estimation method and a rotation estimation program capable of estimating rotational velocity of an incoming ball using a simple configuration that does not require the use of a specialized ball, and also to provide a trajectory prediction device, a trajectory prediction method, a trajectory prediction program, and a ball-returning robot capable of predicting a trajectory of a ball applied with spin with good precision using a simple configuration.

Solution to Problem

A first aspect of the disclosure is a rotation estimation device including an acquisition section and a rotation estimation section. The acquisition section is configured to acquire state information including a measured position and a measured velocity of an incoming ball. The rotation estimation section is configured to solve an aerodynamic model based on the measured position and the measured velocity of the ball at a first time point and on a provisional rotational velocity so as to perform processing to find a predicted position and a predicted velocity of the ball at a second time point different from the first time point for plural of the provisional rotational velocities, and so as to compute as an estimated rotational velocity either the provisional rotational velocity minimizing a difference between the predicted position at the second time point and the measured position at the second time point or a predicted rotational velocity at the second time point corresponding to the provisional rotational velocity minimizing the difference.

The first aspect may be configured further including a counter-striking implement detection section configured to detect a position and an orientation of a counter-striking implement related to a strike in cases in which the ball is incoming due to being struck with the counter-striking implement. The rotation estimation section is further configured to employ the position and the orientation of the counter-striking implement to set a provisional rotational velocity of the ball at the first time point.

The first aspect may be configured such that the rotation estimation section is further configured to set plural different time points as the first time point and find plural of the estimated rotational velocities, and then find a single estimated rotational velocity based on the plural estimated rotational velocities found.

The first aspect may be configured such that the rotation estimation section is further configured to solve an aerodynamic model based on the measured position and the measured velocity at the second time point and on a provisional rotational velocity at the second time point so as to perform processing to find a predicted position and a predicted velocity of the ball at a third time point different from both the first time point and the second time point for a plurality of the provisional rotational velocities at the second time point, so as to adopt as an estimated rotational velocity either the provisional rotational velocity at the second time point minimizing a difference between the predicted position at the third time point and the measured position at the third time point or a predicted rotational velocity at the third time point corresponding to this provisional rotational velocity, and so as to select the plural provisional rotational velocities at the second time point from values close to the estimated rotational velocity at the second time point.

The first aspect may be configured such that the acquisition section is further configured to acquire a measured rotational velocity computed based on apparent movement of a pattern on a surface of the ball, and the rotation estimation section is further configured to select the plural provisional rotational velocities from values close to the measured rotational velocity.

The first aspect may be configured such that at least the measured position and the measured velocity at the first time point are decided based on measured positions and measured velocities of the ball as detected at plural time points until the first time point.

A second aspect of the disclosure is a rotation estimation method in which a computer executes processing including: acquiring state information including a measured position and a measured velocity of an incoming ball; and solving an aerodynamic model based on the measured position and the measured velocity of the ball at a first time point and on a provisional rotational velocity so as to perform processing to find a predicted position and a predicted velocity of the ball at a second time point different from the first time point for plural of the provisional rotational velocities, and so as to compute as an estimated rotational velocity either the provisional rotational velocity minimizing a difference between the predicted position at the second time point and the measured position at the second time point or a predicted rotational velocity at the second time point corresponding to the provisional rotational velocity minimizing the difference.

A third aspect of the disclosure is a rotation estimation program that causes a computer to execute processing including: acquiring state information including a measured position and a measured velocity of an incoming ball; and solving an aerodynamic model based on the measured position and the measured velocity of the ball at a first time point and on a provisional rotational velocity so as to perform processing to find a predicted position and a predicted velocity of the ball at a second time point different from the first time point for plural of the provisional rotational velocities, and so as to compute as an estimated rotational velocity either the provisional rotational velocity minimizing a difference between the predicted position at the second time point and the measured position at the second time point or a predicted rotational velocity at the second time point corresponding to the provisional rotational velocity minimizing the difference.

A fourth aspect of the disclosure is a trajectory prediction device including the rotation estimation device according to the first aspect, and a trajectory prediction section configured to solve an aerodynamic model based on the measured position, the measured velocity, and the estimated rotational velocity at a given time point so as to predict a trajectory of the ball from the given time point onward.

The fourth aspect may be configured such that the trajectory prediction section is further configured to solve a rebound model in cases in which the ball lands so as to predict a trajectory of the ball after landing.

A fifth aspect of the disclosure is a trajectory prediction method including employing the rotation estimation method according to the second aspect to acquire state information including a measured position and a measured velocity of an incoming ball and to compute an estimated rotational velocity of the ball, and solving an aerodynamic model based on the measured position, the measured velocity, and the estimated rotational velocity at a given time point so as to predict a trajectory of the ball from the given time point onward.

A sixth aspect of the disclosure is a trajectory prediction program that causes a computer to execute processing including executing the rotation estimation program according to the third aspect so as to acquire state information including a measured position and a measured velocity of an incoming ball and to compute an estimated rotational velocity of the ball, and solving an aerodynamic model based on the measured position, the measured velocity, and the estimated rotational velocity at a given time point so as to predict a trajectory of the ball from the given time point onward.

A seventh aspect of the disclosure is a ball-returning robot including the trajectory prediction device according to the fourth aspect, a ball-returning striking implement to hit back an incoming ball, a movable section configured to support the ball-returning striking implement so as to allow the ball-returning striking implement to be moved, and a control device configured to control movement of the movable section so as to return the ball based on a trajectory of the ball predicted by the trajectory prediction device.

Advantageous Effects of Invention

The technology disclosed herein enables the rotational velocity of an incoming ball to be estimated using a simple configuration that does not require the use of a specialized ball, and also enables the trajectory of a ball applied with spin to be predicted with good precision using a simple configuration.

DESCRIPTION OF EMBODIMENTS

Figure 1:
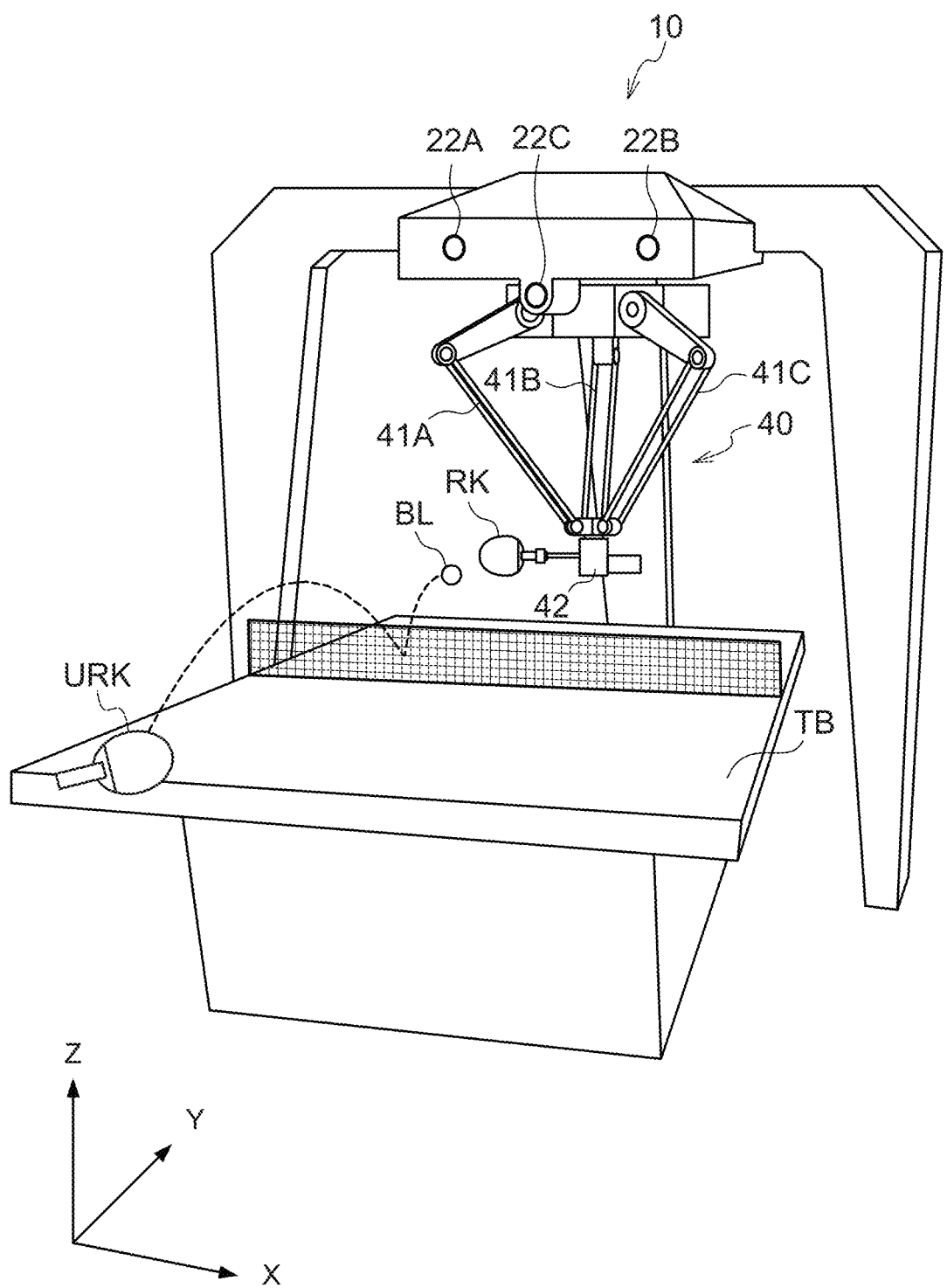
FIG. 1 is an external view of a ball-returning robot.

Explanation follows regarding an example of an exemplary embodiment of technology disclosed herein, with reference to the drawings. Note that the same or equivalent configuration elements and components are allocated the same reference numerals in each of the drawings. The dimensional proportions illustrated in the drawings may be exaggerated in order to aid explanation, and do not necessarily conform to actual proportions.

Figure 2:
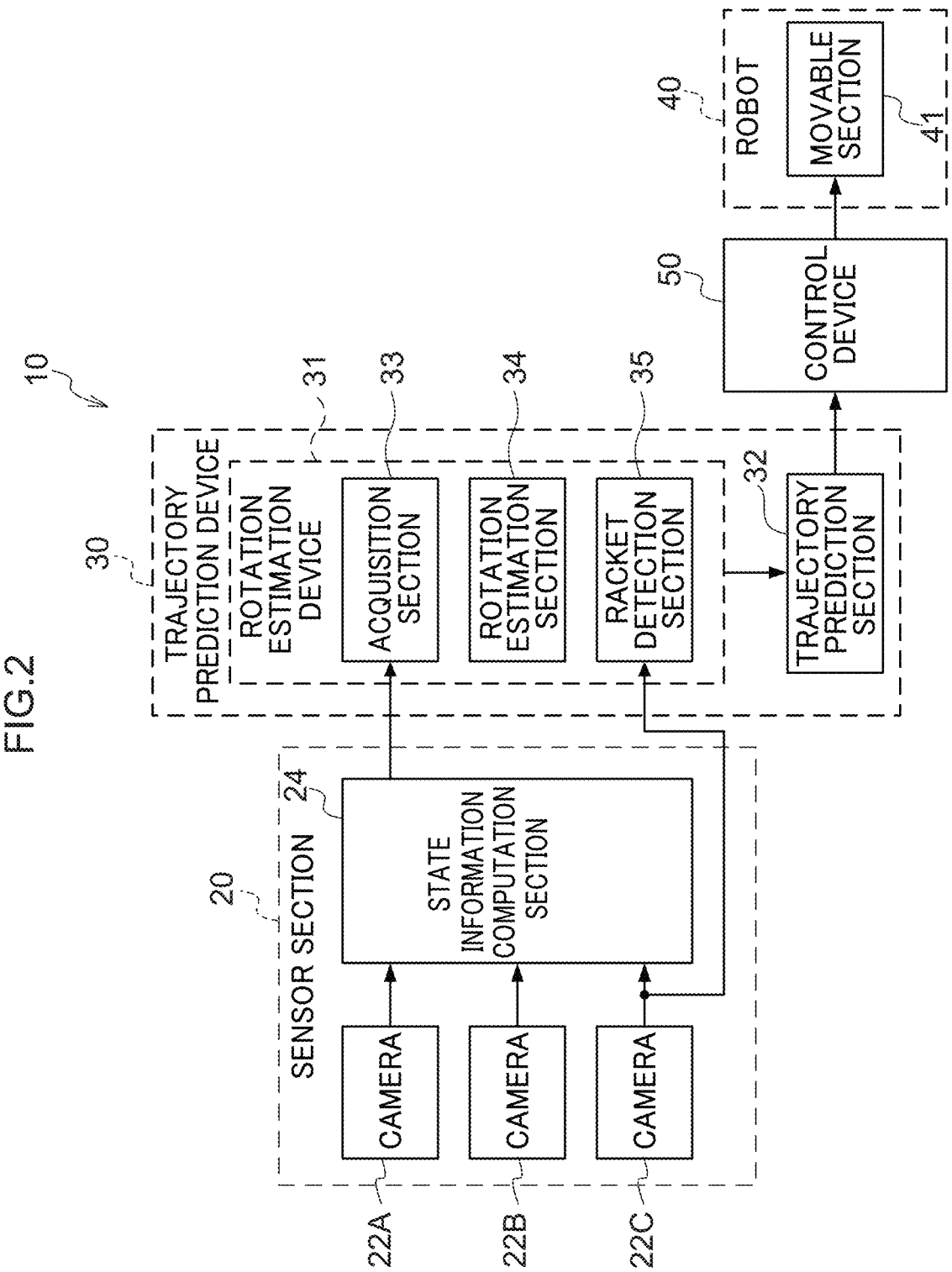
FIG. 2 is a functional block diagram of a ball-returning robot.

FIG. 1 is an external view of a ball-returning robot 10. FIG. 2 is a block diagram illustrating the ball-returning robot 10. The ball-returning robot 10 is a robot that hits back an incoming ball with a ball-returning striking implement. In the present exemplary embodiment, explanation is given regarding an example in which the ball-returning robot 10 is a table tennis robot. Namely, the ball-returning robot 10 is a table tennis robot that uses a racket RK, serving as a ball-returning striking implement, to hit back an incoming table tennis ball BL hit by a non-illustrated user with a racket URK serving as a counter-striking implement after the ball BL has bounced off a table tennis table TB.

As illustrated in FIG. 1 and FIG. 2, the ball-returning robot 10 includes a sensor section 20, a trajectory prediction device 30, a robot 40, and a control device 50.

The sensor section 20 detects state information including a measured position, a measured velocity, and a measured rotational velocity of the incoming ball BL. In the present exemplary embodiment, as illustrated in FIG. 1 and FIG. 2, the sensor section 20 includes three cameras 22A, 22B, and 22C, and a state information computation section 24. Note that in the present exemplary embodiment, explanation follows regarding an example in which the measured rotational velocity is an angular velocity (rad/s).

The cameras 22A, 22B are installed at positions capable of imaging the ball BL from different angles at a predetermined frame rate as the ball BL moves back and forth across the table tennis table TB. The cameras 22A, 22B function as what is referred to as a stereo camera.

The camera 22C is installed at a position capable of imaging a racket held by the non-illustrated user.

The state information computation section 24 computes the measured position and the measured velocity of the ball BL based on captured images of the ball BL as captured by the cameras 22A, 22B. Namely, the state information computation section 24 detects a two-dimensional position of the ball BL in each captured image by performing known image processing such as feature extraction processing on each of two captured images captured from different angles. Based on the two-dimensional positions of the ball BL in the two captured images, what is referred to as a stereo method is applied to compute the measured position, this being a three-dimensional position of the ball BL. The state information computation section 24 also computes a movement distance and a movement duration of the ball BL based on the most recent three-dimensional position of the ball BL and a previously computed three-dimensional position of the ball BL, and then computes the measured velocity of the ball BL based on the computed movement distance and movement duration. Note that the measured velocity of the ball BL is a vector amount, and includes components in each of three mutually orthogonal axial directions, namely an X axis, a Y axis, and a Z axis.

The state information computation section 24 also computes the measured rotational velocity (angular velocity in the present exemplary embodiment) based on the apparent movement of a pattern on a surface of the ball BL. For example, the state information computation section 24 extracts a pattern on the surface of the ball BL based on captured images of the ball BL. Then, for example, a movement velocity is computed as the apparent movement of the extracted pattern, and the measured rotational velocity of the ball BL is then computed based on the computed movement velocity. The extracted pattern may be a mark such as a logo pre-printed on part of the ball BL, or may be a mark additionally applied to the ball BL specifically for use in extraction. In cases in which the ball BL is a tennis ball, the seams of the ball may also be extracted as the pattern.

Explanation follows regarding computation of the measured rotational velocity. Note that finding the measured rotational velocity is not essential, as described later with reference to FIG. 7.

To compute the measured rotational velocity, after the position of a mark on the ball BL has been detected, computation to (1) estimate the orientation of the ball BL and (2) to compute the measured rotational velocity are performed in this sequence.

(1) Estimating Ball BL Orientation

Figure 3:
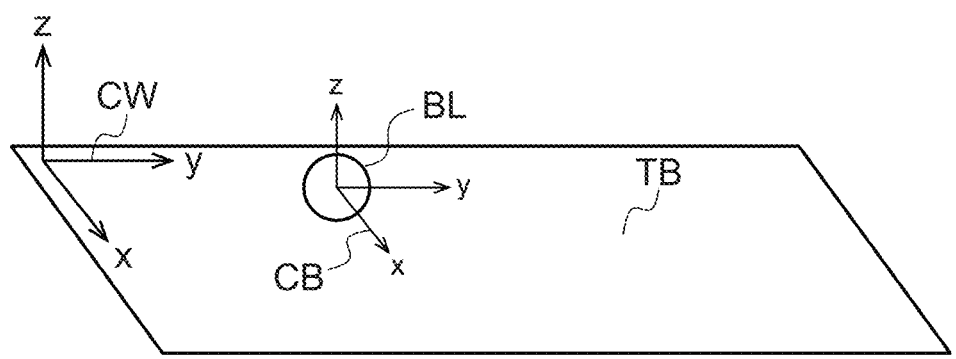
FIG. 3 is a diagram to explain a reference coordinate system and a ball coordinate system.

As illustrated in FIG. 3, a ball coordinate system CB is defined as a coordinate system having respective axes running parallel to their counterparts in a reference coordinate system CW referenced on the table tennis table TB, and having an origin at the center of the ball BL. The position of a mark in the ball coordinate system CB expresses the orientation of the ball BL.

When a center position of the ball BL is defined as $$P_b^c = (X_b^c, Y_b^c, Z_b^c)$$

and a center position of the mark is defined as $$P_I^c = (X_I^c, Y_I^c, Z_I^c)$$

in a camera coordinate system of the camera 22C, and r is the radius of the ball BL, the following Equation is established.

$$(X_I^c - X_b^c)^2 + (Y_I^c - Y_b^c)^2 + (Z_I^c - Z_b^c)^2 = r^2 \qquad \text{Equation (1)}$$

When (u, v) are the coordinates of the mark on the ball BL in a captured image captured by the camera 22C, the following Equation is established due to the characteristics of the camera 22C.

$$\begin{pmatrix} X_b^c \\ Y_b^c \\ Z_b^c \end{pmatrix} = \begin{pmatrix} f_x & 0 & c_x \\ 0 & f_y & c_y \\ 0 & 0 & 1 \end{pmatrix}^{-1} \begin{pmatrix} su \\ sv \\ s \end{pmatrix} \qquad \text{Equation (2)}$$

Wherein: $f_x$, $f_y$ are the focal distance of the camera 22C; $c_x$, $c_y$ are the optical center of the camera 22C; and s is a freely selected constant representing a scale factor.

A similar relationship is also established for the coordinates of the center position of the ball BL. Moreover, when $P_b^W$ is the center position of the ball BL in the reference coordinate system CW as computed based on captured images from the cameras 22A, 22B, and $P_c^W$ is the position of the camera 22C in the same reference coordinate system CW, then a distance D between the two positions is $$D = \|P_b^W - P_c^W\|$$

and the following Equation is established.

$$X_b^{c2} + Y_b^{c2} + Z_b^{c2} = D^2 \qquad \text{Equation (3)}$$

Since the relationship between the camera coordinate system of the camera 22C and the reference coordinate system CW is calibrated in advance, $P_c^W$ is already known. Accordingly, the center position $P_b^c$, $P_I^c$ of the ball BL in the camera coordinate system can be computed using Equations (1) to (3) above.

Next, a coordinate $POSE^c$ of the position of the mark expressing the orientation of the ball BL in the camera coordinate system is computed using the following Equation.

$$POSE^c = P_I^c - P_b^c \qquad \text{Equation (4)}$$

Next, a coordinate $POSE^b$ of the position of the mark expressing the orientation of the ball BL in the reference coordinate system CW is computed using the following Equation.

$$POSE^b = R^{-1} POSE^c \qquad \text{Equation (5)}$$

Wherein R corresponds to a rotation matrix out of external parameters of the camera with respect to the reference coordinate system CW.

Computing n (n being three or more) coordinates POSE$^b$ of the position of the mark of the ball BL enables a rotational velocity ω ($ω_x$, $ω_y$, $ω_z$) of the ball BL to be computed.

The n or more mark position coordinates POSE$^b$ are fitted onto a flat plane to compute a rotational angle ψ for a rotation axis k=$[k_x, k_y, k_z]^T$ as a vector normal to this flat plane.

Figure 4:
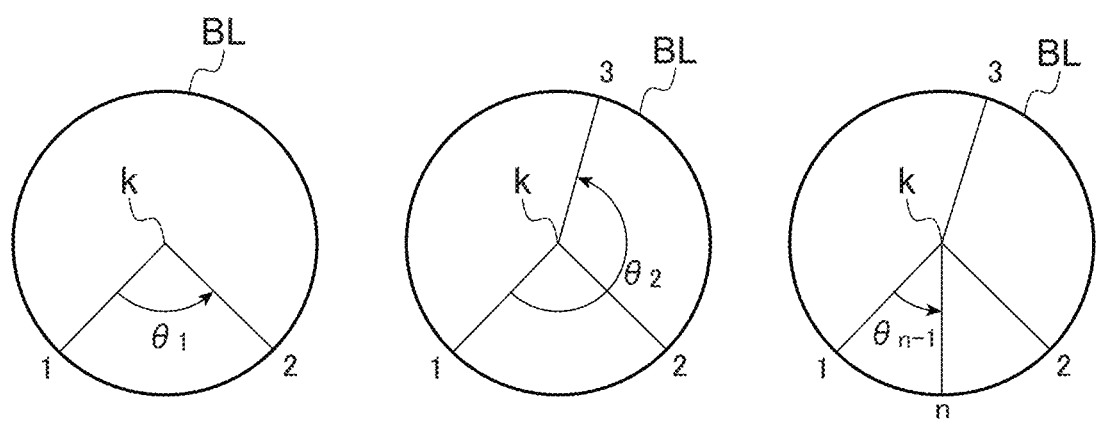
FIG. 4 are diagrams to explain computation of a measured rotational velocity of a ball.

FIG. 4 illustrates diagrams looking down on a flat plane in which n mark position coordinates POSE$^b$ have been fitted from directly above, namely looking down on the flat plane as viewed along the direction of the rotation axis k. In the leftmost diagram of FIG. 4, a rotational angle between the position of the mark on a first detection and the position of the mark on a second detection is labeled $θ_1$. In the center diagram of FIG. 4, a rotational angle between the position of the mark on the first detection and the position of the mark on a third detection is labeled $θ_2$. In the rightmost diagram of FIG. 4, a rotational angle between the position of the mark on the first detection and the position of the mark on an $n^{th}$ detection is labeled $θ_{n-1}$.

When n mark position coordinates POSE$^b$ have been collected, the rotational angle ψ centered on the rotation axis k can be computed using the following Equation.

$$\varphi = \frac{m \times 2\pi + \theta_{n-1}}{(n-1)T} \quad \text{Equation (6)}$$

Wherein m is the number of full revolutions of the mark, and $θ_{n-1}$ is the rotational angle between the position of the mark on the first detection and the position of the mark on the $n^{th}$ detection. T is the frame rate of the camera 22C (msec).

The measured rotational velocity ω can then be computed using the following Equation.

$$\omega = \frac{k}{|k|} \cdot \varphi \quad \text{Equation (7)}$$

As illustrated in FIG. 2, the trajectory prediction device 30 includes functionality of a rotation estimation device 31 and a trajectory prediction section 32.

The rotation estimation device 31 includes an acquisition section 33, a rotation estimation section 34, and a racket detection section 35 serving as a counter-striking implement detection section.

The acquisition section 33 is configured to acquire state information including the measured position, measured velocity, and measured rotational velocity of the incoming ball BL from the sensor section 20.

The rotation estimation section 34 is configured to solve an aerodynamic model based on the measured position and the measured velocity of the ball BL for a first time point and on a provisional rotational velocity so as to perform processing to find a predicted position and a predicted velocity of the ball BL at a second time point different from the first time point. For example, the second time point is later than the first time point. The rotation estimation section 34 performs this processing for plural provisional rotational velocities, and computes as an estimated rotational velocity either the provisional rotational velocity minimizing a difference between the predicted position at the second time point and the measured position at the second time point, or a predicted rotational velocity at the second time point corresponding to the provisional rotational velocity minimizing the difference. Note that the measured velocity at the first time point may be found based on the difference between the measured position at the first time point and the measured position at a time point prior to the first time point.

Figure 5:
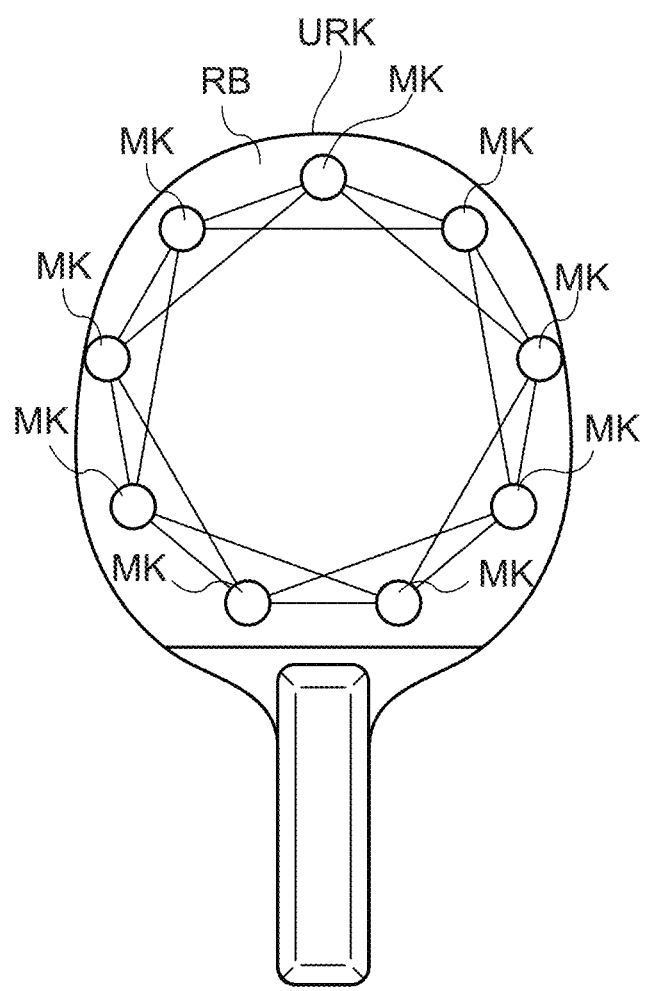
FIG. 5 is a plan view illustrating an example of a racket.

The racket detection section 35 detects a position and an orientation of the racket URK related to a strike in cases in which the ball BL is incoming due to being struck by the racket URK. For example, as illustrated in FIG. 5, plural markings MK are provided on a rubber RB of the racket URK. In the example of FIG. 5, nine of the markings MK corresponding to a regular nonagon are provided on the rubber RB. The racket detection section 35 performs image processing on captured images captured by the camera 22C in order to identify the position of the racket URK, and also to identify the positions of the nine markings MK. The racket detection section 35 then identifies the orientation of the racket URK based on the positional relationship of the respective markings. Note that configuration may be made in which the racket URK is not provided with the markings MK, and the orientation of the racket URK is identified by detecting the outer profile of the racket URK.

When the position and orientation of the racket URK have been detected, the rotation estimation section 34 employs the position and orientation of the racket URK to set a provisional rotational velocity of the ball BL at the first time point.

Note that the rotation estimation section 34 may be further configured to set plural different time points as the first time point and find plural estimated rotational velocities, and then to find a single estimated rotational velocity based on the plural found estimated rotational velocities. For example, estimated rotational velocities may be found for several different first time points, and a mean value of the plural estimated rotational velocities may be found as the single estimated rotational velocity. In such cases, the respective time spans from the first time points to the second time point may partially overlap.

The rotation estimation section 34 may be further configured to solve an aerodynamic model based on the measured position and the measured velocity at the second time point and on a provisional rotational velocity at the second time point so as to perform processing to find a predicted position and a predicted velocity of the ball BL at a third time point different from both the first time point and the second time point. For example, in cases in which the second time point is later than the first time point, the third time point may be even later than the second time point. The rotation estimation section 34 performs this processing for plural provisional rotational velocities at the second time point, and computes as an estimated rotational velocity either the provisional rotational velocity at the second time point minimizing a difference between the predicted position at the third time point and the measured position at the third time point, or a predicted rotational velocity at the third time point corresponding to the provisional rotational velocity at the second time point minimizing this difference. The plural provisional rotational velocities at the second time point may be selected from values close to the estimated rotational velocity at the second time point.

The rotation estimation section 34 may further select the plural provisional rotational velocities from values close to the measured rotational velocity.

The trajectory prediction section 32 solves an aerodynamic model based on the measured position, measured velocity, and estimated rotational velocity at a given time point so as to predict a trajectory of the ball BL from the given time point onward.

The trajectory prediction section 32 also solves a rebound model in cases in which the ball BL lands in order to predict a trajectory of the ball BL after landing.

The robot 40 includes a movable section 41 that supports the racket so as to allow the racket RK to be moved. As illustrated in FIG. 1, the movable section 41 of the present exemplary embodiment includes three robot arms 41A, 41B, and 41C and a support section 42 that supports the racket RK as an example. Namely, the robot 40 is what is referred to as a parallel link robot, and the robot arms 41A, 41B, 41C are controlled in parallel to control the behavior of the racket RK supported by the support section 42 at a leading end of the robot arms 41A, 41B, 41C. The support section 42 includes a drive mechanism to vary the orientation of the racket RK. Note that the robot 40 is not limited to a parallel link robot, and another type of robot may be employed therefor.

The control device 50 controls movement of the movable section 41 so as to return the ball BL based on the trajectory of the ball BL predicted by the trajectory prediction device 30.

Figure 6:
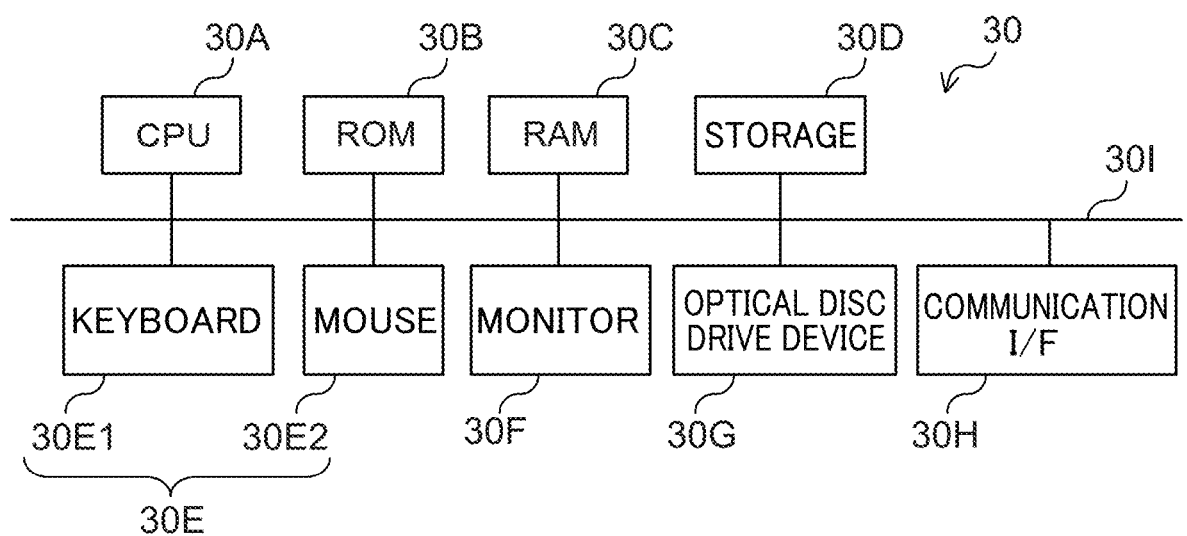
FIG. 6 is a block diagram illustrating a hardware configuration of a trajectory prediction device.

Next, explanation follows regarding a hardware configuration of the trajectory prediction device 30, with reference to the block diagram illustrated in FIG. 6.

As illustrated in FIG. 6, the trajectory prediction device 30 includes a central processing unit (CPU) 30A, read only memory (ROM) 30B, random access memory (RAM) 30C, storage 30D, an input section 30E, a monitor 30F, an optical disc drive device 30G, and a communication interface 30H. Each of these configuration elements are connected together through a bus 301 so as to be capable of communicating with each other In the present exemplary embodiment, a trajectory prediction program (including a rotation estimation program) is held in either the ROM 30B or the storage 30D. The CPU 30A is a central processing unit that executes various programs and controls various configurations. Namely, the CPU 30A reads a program from the ROM 30B or the storage 30D and executes the program using the RAM 30C as a workspace. The CPU 30A controls the various configurations and performs various computation processing according to the program recorded in the ROM 30B or the storage 30D.

The ROM 30B holds various programs and various data. The RAM 30C serves as a workspace that temporarily stores programs and data. The storage 30D is configured by a hard disk drive (HDD) or a solid state drive (SSD), and holds various programs including an operating system, as well as various data.

The input section 30E includes a keyboard 30E1 and a pointing device such as a mouse 30E2, and is employed to perform various input. The monitor 30F is, for example, a liquid crystal display, and displays various information. The monitor 30F may employ a touch panel so as to function as the input section 30E. The optical disc drive device 30G reads data stored on various recording media (such as CD-ROMs or Blu-ray discs), writes data onto various recording media, and so on.

The communication interface 30H is an interface for communicating with other devices, and may employ a protocol such as Ethernet (registered trademark), FDDI, or Wi-Fi (registered trademark).

The respective functional configurations of the trajectory prediction device 30 illustrated in FIG. 2 are implemented by the CPU 30A reading the trajectory prediction program stored in the ROM 30B or the storage 30D, and expanding and executing the program using the RAM 30C.

Next, explanation follows regarding operation of the trajectory prediction device 30.

Figure 7:
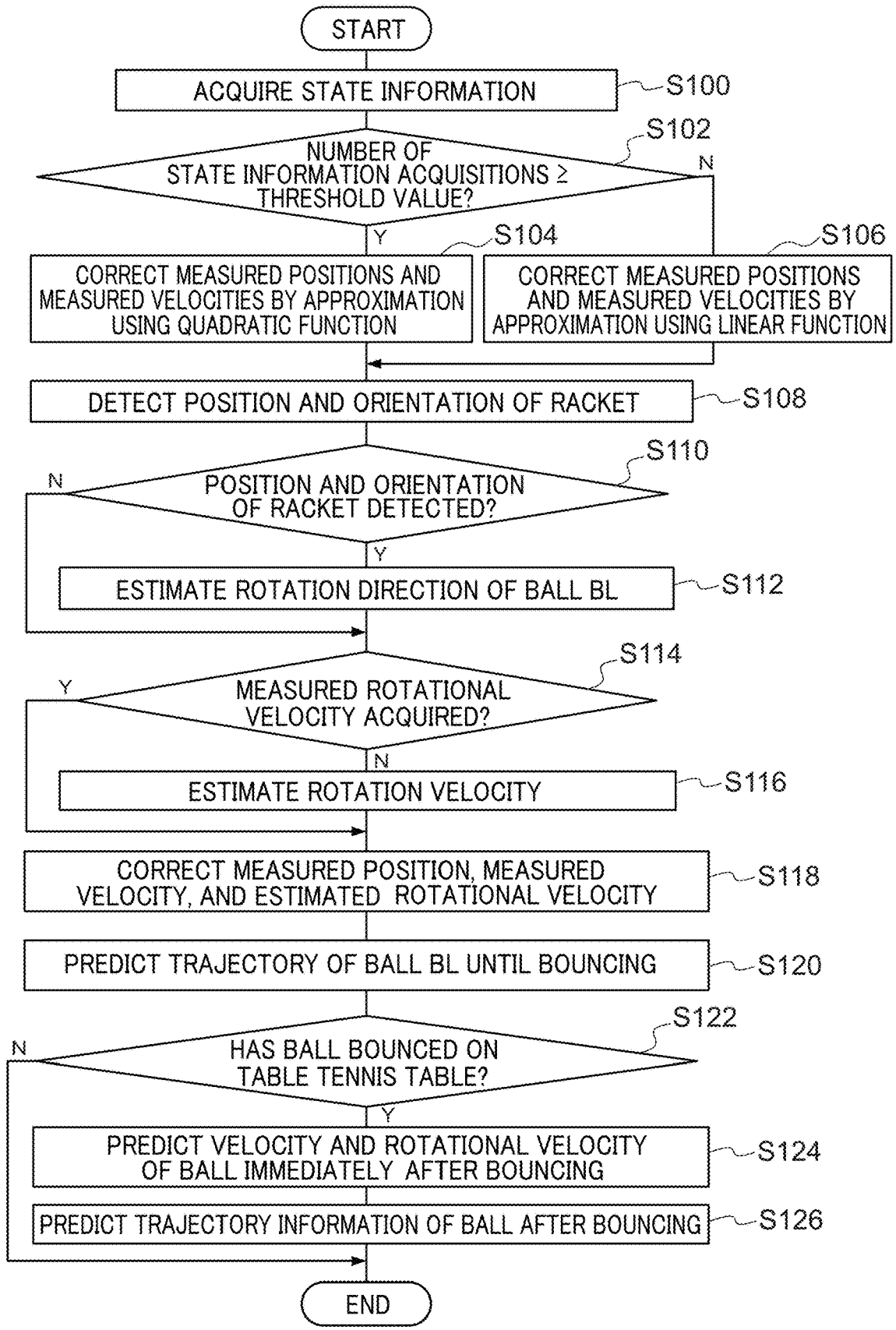
FIG. 7 is a flowchart illustrating a flow of trajectory prediction processing.

FIG. 7 is a flowchart illustrating a flow of the trajectory prediction processing (including rotation estimation processing) executed by the trajectory prediction device 30. When a user operates the input section 30E to instruct execution of the trajectory prediction processing, the CPU 30A reads the trajectory prediction program from the ROM 30B or the storage 30D, and expands and executes the trajectory prediction program using the RAM 30C in order to execute the trajectory prediction processing. The trajectory prediction processing illustrated in FIG. 7 is executed repeatedly until an instruction to end the processing is given.

When the trajectory prediction processing illustrated in FIG. 7 is executed, the cameras 22A, 22B, 22C of the sensor section 20 start imaging, and the measured position, measured velocity, and measured rotational velocity of the ball BL computed by the state information computation section 24 are sequentially output to the trajectory prediction device 30 in time series. Captured images captured by the camera 22C are also sequentially output to the racket detection section 35 in time series.

At step S100, the CPU 30A functions as the acquisition section 33 in order to acquire state information including the measured position and measured velocity of the incoming ball BL from the sensor section 20.

At step S102, the CPU 30A functions as the rotation estimation section 34 in order to determine whether or not the number of state information acquisitions is a predetermined threshold value or greater. The threshold value is a number of state information acquisitions necessary in order to approximate the measured positions and measured velocities of the ball using a quadratic function.

Processing transitions to step S104 in cases in which the number of state information acquisitions is the predetermined threshold value or greater, and processing transitions to step S106 in cases in which the number of state information acquisitions is below the predetermined threshold value.

At step S104, the CPU 30A functions as the rotation estimation section 34 in order to correct the measured positions and measured velocities acquired at step S100. Specifically, a quadratic function used to approximate the measured positions in the time series acquired at step S100 is for example computed using a least squares method. The computed quadratic function is then employed to correct the measured positions in the time series acquired at step S100. Namely, the measured positions are corrected such that after correction the measured positions can be plotted on a curve expressed by a quadratic function. The measured velocities are also corrected in a similar manner to the measured positions.

At step S106, the CPU 30A functions as the rotation estimation section 34 in order to correct the measured positions and measured velocities acquired at step S100. Specifically, a linear function used to approximate the measured positions in the time series acquired at step S100 is for example computed using a least squares method. The computed linear function is then employed to correct the measured positions in the time series acquired at step S100. Namely, the measured positions are corrected such that after correction the measured positions can be plotted on a straight line expressing the linear function. The measured velocities are also corrected in a similar manner to the measured positions.

At step S108, the CPU 30A functions as the racket detection section 35 so as to detect the position and orientation of the racket URK related to a strike in cases in which the ball BL is incoming due to being struck with the racket URK. For example, known image processing such as pattern matching is performed on respective captured images sequentially captured by the camera 22C in order to identify plural captured images in which the ball BL appears inside a striking face of the racket URK or close to the racket URK. Namely, plural captured images captured from immediately prior to the racket URK striking the ball BL to immediately after the racket URK striking the ball BL are identified. A three-dimensional position of the racket URK is then computed from the position of the racket URK in the captured image for each of the identified captured images. This computation may, for example, employ a transformation formula to transform the positions in the captured images to three-dimensional positions. In each of the identified captured images, the orientation of the racket URK is computed based on the positions of the markings MK provided on the racket URK. The orientation of the racket URK corresponds to angles $\alpha$, $\beta$ expressing the orientation of the racket URK illustrated in FIG. 12, described later.

At step S110, the CPU 30A functions as the racket detection section 35 in order to determine whether or not the racket URK could be detected, specifically whether or not positions and orientations of the racket URK could be detected in plural captured images out of the captured images captured by the camera 22C. Processing transitions to step S112 in cases in which the positions and orientations of the racket URK could be detected in the plural captured images, and processing transitions to step S114 in cases in which the positions and orientations of the racket URK could not be detected.

At step S112, the CPU 30A functions as the rotation estimation section 34 to estimate a rotation direction of the ball BL based on the plural positions and orientations of the racket URK detected at step S110. For example, the velocity of the racket URK is computed from the plural positions of the racket URK, and a change amount in the orientation of the racket URK, namely change amounts of the angle $\alpha$ and the angle $\beta$ are also computed. A computation formula or table-based data for computation of the rotation direction of the ball BL is then employed to compute the rotation direction based on the velocity and change in orientation of the racket URK.

The racket detection section 35 may be omitted in the present exemplary embodiment. In such cases, steps S108, S110, and S112 may be skipped.

At step S114, the CPU 30A functions as the rotation estimation section 34 in order to determine whether or not the measured rotational velocity could be acquired. Namely, determination is made as to whether or not the measured rotational velocity $\omega$ computed by the state information computation section 24 could be acquired at step S100 based on captured images captured by the camera 22C using Equation (7). Cases in which a measured rotational velocity could not be acquired, include, for example, cases in which the mark applied to the ball BL is at a position that is not visible from the camera 22C.

Processing then transitions to step S116 in cases in which the measured rotational velocity $\omega$ could not be acquired, whereas the measured rotational velocity $\omega$ is taken as the estimated rotational velocity and processing transitions to step S118 in cases in which the measured rotational velocity $\omega$ could be acquired.

In the present exemplary embodiment, acquisition of the measured rotational velocity $\omega$ may be omitted. In such cases, step S114 is skipped and the processing of step S116 is executed in every case.

Figure 8:
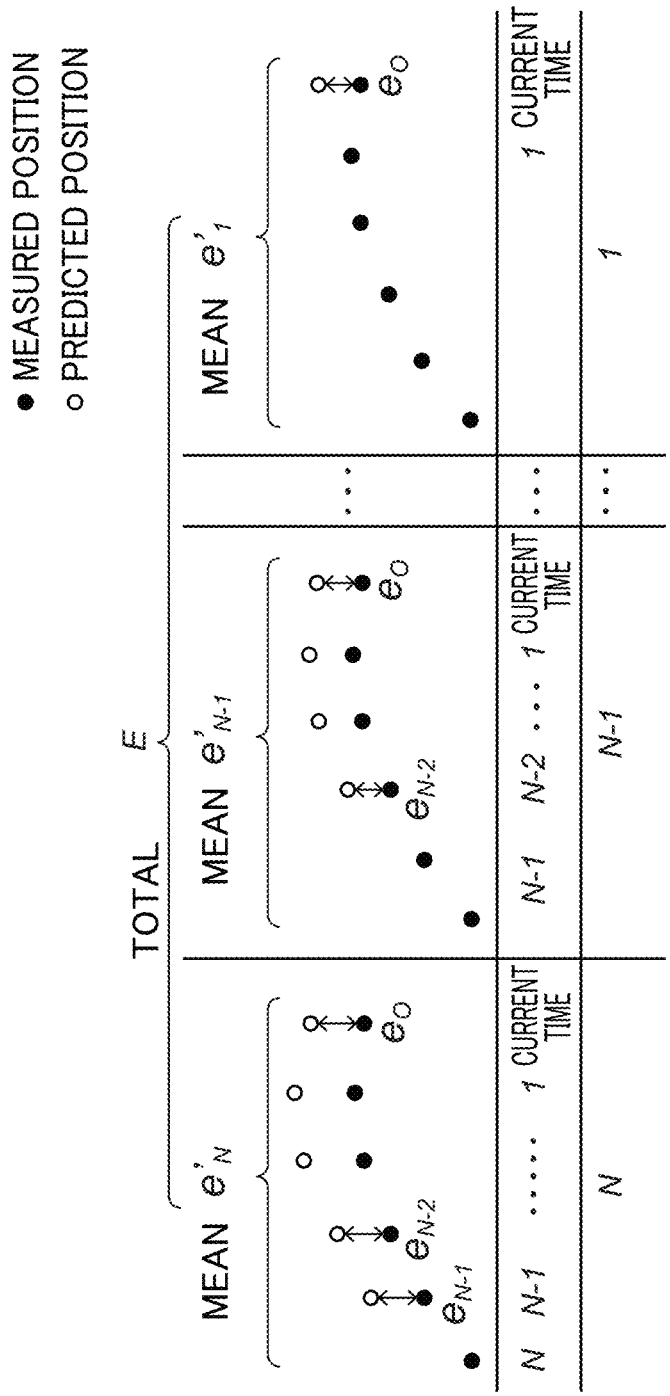
FIG. 8 is a diagram illustrating an example of measured positions and predicted positions of a ball.

At step S116, the rotational velocity of the ball BL is estimated using a search algorithm. In order to find the rotational velocity, first, as illustrated in FIG. 8, an aerodynamic model is employed to compute predicted positions for all captured measurement points spanning from a past time point N until a current time point. Namely, in a case in which N individual measured positions have been obtained between the time point N and the current time point, the aerodynamic model is solved based on the measured position and the measured velocity of the ball BL at the time point N (as a first time point) and on the provisional rotational velocity in order to find a predicted position and a predicted velocity of the ball BL from a time point (N−1) (as a second time point) subsequent to the time point N onward. The provisional rotational velocity is, for example, set to a predetermined rotational velocity.

Next, the aerodynamic model is solved based on the measured position and the measured velocity of the ball BL at a first time point (N−1) (as a first time point) following the time point N, and on the provisional rotational velocity, so as to find a predicted position and a predicted velocity of the ball BL from a time point (N−2) (as a second time point) subsequent to the time point (N−1) onward. Similar processing is performed for a time point (N−3) up to the current time point. Note that although in this example the second time point is set as a time point after the first time point when finding the predicted position and the predicted velocity at the second time point based on the measured position and the measured velocity at the first time point and on the provisional rotational velocity, alternatively, the second time point may be set as a time point earlier than the first time point when finding the predicted position and the predicted velocity at the second time point based on the measured position and the measured velocity at the first time point and on the provisional rotational velocity. A "prediction" in this context refers to a computed value relating to the past relative to the first time point.

The aerodynamic model is expressed by the following Equation. The following Equation takes the measured position, the measured velocity, and the provisional rotational velocity of the ball BL as input in order to obtain a predicted position by running a time evolution. Note that in cases in which the second time point is a time point set earlier than the first time point, the timing t is a negative value.

$$\ddot{p} = -g - C_D(t)\frac{\rho}{m}S_b\|\dot{p}(t)\|\dot{p}(t) + C_M(t)\frac{\rho}{m}V_b\omega \times \dot{p}(t) \qquad \text{Equation (8)}$$

Wherein p(t) is the position of the ball BL. $\dot{p}(t)$ is a measured velocity obtained by the first derivative of the measured position p(t). $\ddot{p}(t)$ is an acceleration obtained by the second derivative of p(t). $\omega$ is the provisional rotational velocity of the ball BL. g is gravitational acceleration, this being 9.8 m/s$^2$. Sb is the cross-sectional area of the ball BL, this being $\pi r^2$ wherein r is the radius of the ball BL. Vb is the volume of the ball BL, this being $(4/3)\times\pi r^3$. m is the mass of the ball BL, and is, for example, 2.7×10$^{-3}$ kg. $\rho$ is air density, and is, for example, 1.184 kg/m$^3$ (at 25° C.).

$C_D(t)$ is a Drag coefficient, and is, for example, 0.5. $C_M(t)$ is a Magnus coefficient, and is, for example, 0.2.

Figure 9:
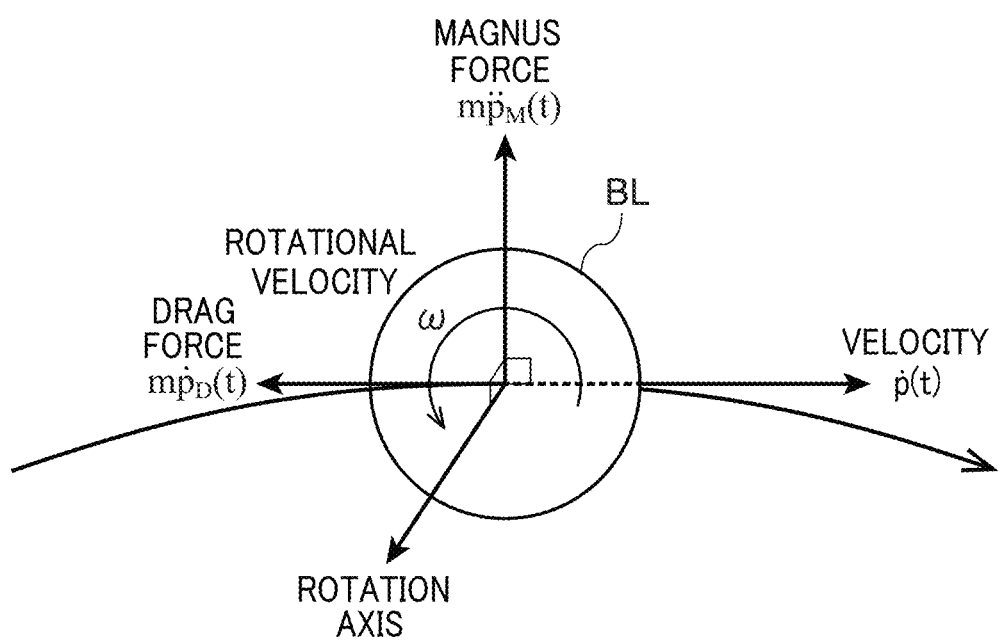
FIG. 9 is a diagram to explain drag force, Magnus force, and the like acting on a ball.

FIG. 9 illustrates a relationship between Drag force, Magnus force, the velocity $\dot{p}(t)$, and the rotation axis of the ball BL.

After computing the predicted position of the ball BL, the following Equation is used to compute an evaluation value $E(\omega)$ to evaluate error between the measured position and the predicted position of the ball BL.

$$E(\omega) = \sum_{i=1}^{N} e'_i(\omega) = \sum_{i=1}^{N} \sum_{j=0}^{i-1} \frac{1}{i} - e_j(\omega) \quad \text{Equation (9)}$$

$e_j$ (j=1, 2, . . . , j−1) is the error between the measured position and the predicted position at measurement points until one time point earlier than the current time point. $e_j'$ (j=1, 2, . . . , N) is a mean of $e_j$ for all time points from the time point (j−1) to the current time point.

A search range of provisional rotational velocities ω is then set, and a predicted position is computed using Equation (8) above for each of the plural provisional rotational velocities ω within the set search range. Equation (9) is then used to compute the evaluation value $E(\omega)$ for each of the provisional rotational velocities ω based on the error between the computed predicted position and the measured position. The provisional rotational velocity ω when the evaluation value $E(\omega)$ is at a minimum is adopted as the estimated rotational velocity. Note that a provisional rotational velocity giving a smaller evaluation value $E(\omega)$ than when employing any of the plural provisional rotational velocities ω within the set search range may be found using a method of interpolation and this may be adopted as the estimated rotational velocity.

Alternatively, a predicted rotational velocity at the second time point found by solving the aerodynamic model based on the provisional rotational velocity (provisional rotational velocity at the first time point) when the evaluation value $E(\omega)$ is at a minimum and on the measured position and the measured velocity at the first time point may be adopted as an estimated rotational velocity.

Note that the search range of the provisional rotational velocity ω is, for example, set as a range centered on a predetermined rotational velocity and within which the difference from the central rotational velocity is within a predetermined value. Alternatively, instead of setting a search range, an initial rotational velocity may be set to zero and the rotational velocity gradually increased.

In the present exemplary embodiment, when a measured rotational velocity could be acquired at step S114, this measured rotational velocity is treated as the estimated rotational velocity, and the rotational velocity estimation of step S116 is not performed. However, the rotational velocity estimation of step S116 may be performed even when a measured rotational velocity could be acquired at step S114. In such cases, the search range of the provisional rotational velocity ω may be set to a range centered on the measured rotational velocity and within which the difference from the measured rotational velocity is within a predetermined value. Namely, plural provisional rotational velocities ω may be selected from out of values close to the measured rotational velocity. This enables the search range of the provisional rotational velocities to be narrowed down.

In cases in which the rotation direction of the ball BL has been estimated at step S112 based on the position and orientation of the racket URK, the estimated rotation direction may also be employed in setting the search range of the provisional rotational velocity ω.

Alternatively, configuration may be made such that the aerodynamic model is solved based on the measured position and the measured velocity at a second time point (for example the time point (N−1)) and on the provisional rotational velocity at the second time point (for example the time point (N−1)) so as to perform processing to find the predicted position and the predicted velocity of the ball BL at a third time point (for example the time point (N−2)) that is later than the second time point (for example the time point (N−1)) for the plural provisional rotational velocities at the second time point (for example the time point (N−1)). Either the provisional rotational velocity at the second time point (for example the time point (N−1)) minimizing a difference between the predicted position at the third time point (for example the time point (N−2)) and the measured position at the third time point (for example the time point (N−2)), or a predicted rotational velocity at the third time point (for example the time point (N−2)) corresponding to this provisional rotational velocity may then be adopted as an estimated rotational velocity. The plural provisional rotational velocities at the second time point (for example the time point (N−1)) may be selected from values close to the estimated rotational velocity at the second time point (for example the time point (N−1)). Note that although the first time point, the second time point, and the third time point are set in forward chronological sequence in this case, they may be set in the reverse sequence, or any other sequence.

Moreover, at least the measured position and the measured velocity at the first time point may be decided based on measured positions or measured velocities of the ball as detected at plural time points until the first time point by the state information computation section 24 or the rotation estimation section 34.

At step S118, the CPU 30A functions as the rotation estimation section 34 in order to correct the measured position, the measured velocity, and the estimated rotational velocity of the ball BL until the present, for example using a non-linear Kalman filter. Note that the measured position, the measured velocity, and the estimated rotational velocity of the ball BL until the present may be corrected by using functional approximation employing a least squares method or the like.

Figure 10:
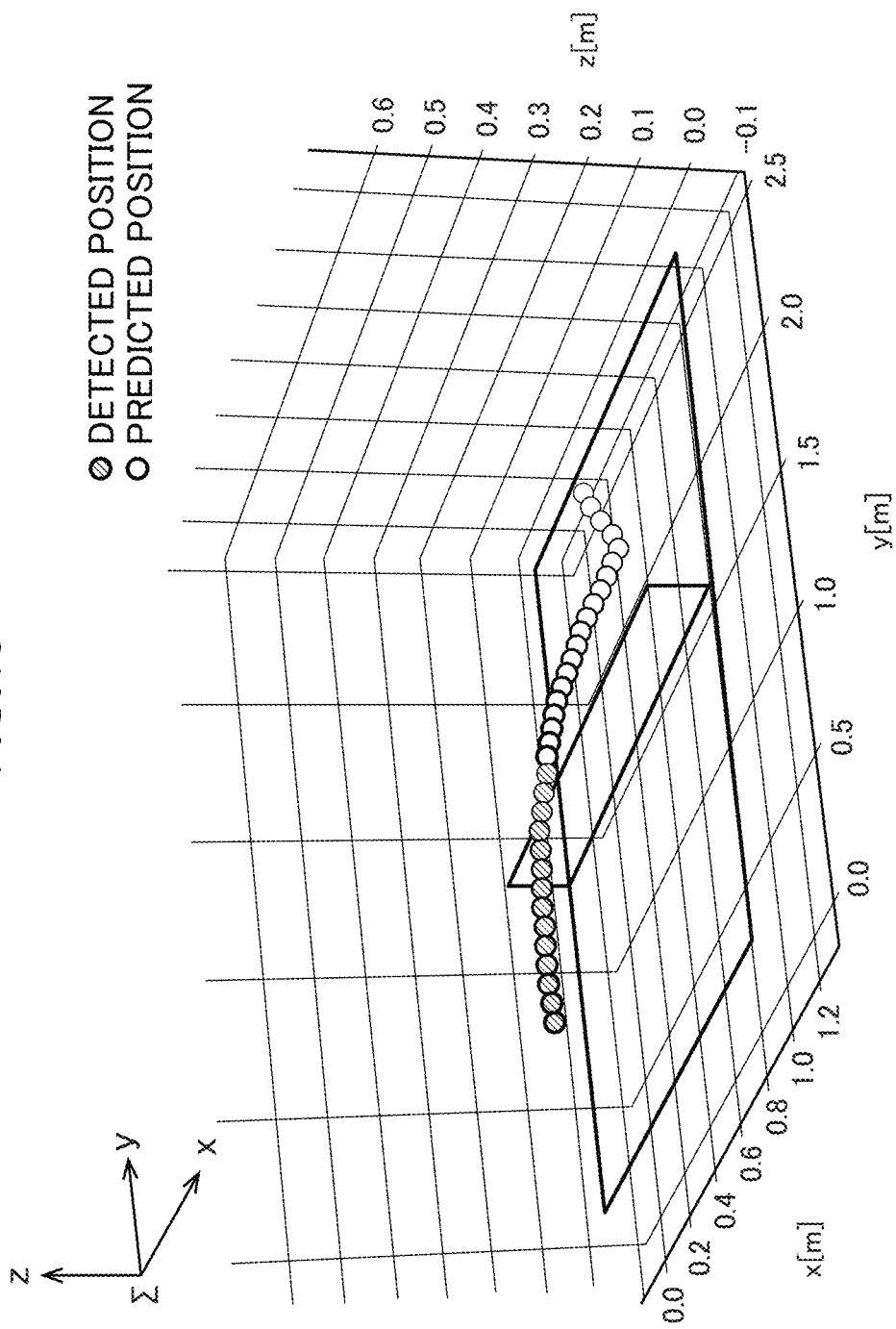
FIG. 10 is a diagram illustrating an example of detected positions and predicted positions of a ball.

At step S120, the CPU 30A functions as the trajectory prediction section 32 so as to predict trajectory information relating to a predicted trajectory of the ball BL until the ball BL bounces on the table tennis table TB, based on the state information including the measured position, the measured velocity, and the estimated rotational velocity of the ball BL corrected at step S118. Note that the trajectory information relating to the predicted trajectory is information in which positions, velocities, and rotational velocities of the ball BL as predicted from the state information detected in time series until the present are expressed in time series. FIG. 10 illustrates an example of detected positions (measured positions) of the ball BL as detected by the sensor section 20 and predicted positions of the ball BL as predicted by the trajectory prediction section 32. As illustrated in FIG. 10, in the present exemplary embodiment, the table tennis table TB corresponds to a Z axis coordinate of zero. Accordingly, determination as to whether or not the ball BL has bounced on the table tennis table TB can be made based on whether or not the ball BL has reached the Z axis coordinate of zero at an X axis coordinate and a Y axis coordinate that fall within an X axis coordinate and Y axis coordinate range of the table tennis table TB.

The trajectory information for the predicted trajectory of the ball BL is more specifically obtained by inputting the measured velocity and the estimated rotational velocity of the ball BL corrected at step S118 into the Equation (8) that expresses an aerodynamic model, and running a time evolution.

At step S122, the CPU 30A functions as the trajectory prediction section 32 to determine whether or not the ball BL has bounced on the table tennis table TB. Specifically, based on the trajectory information of the ball BL, determination is made that the ball BL has bounced on the table tennis table TB in cases in which the ball BL has reached the Z axis coordinate of zero at an X axis coordinate and a Y axis coordinate that fall within the X axis coordinate and Y axis coordinate range of the table tennis table TB.

Processing transitions to step S124 in cases in which the ball BL has bounced on the table tennis table TB, whereas the present routine is ended in cases in which the ball BL has not bounced on the table tennis table TB.

Figure 11:
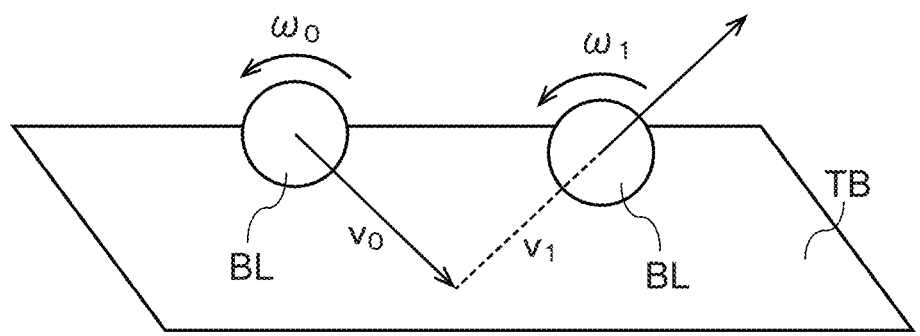
FIG. 11 is a diagram to explain velocity and acceleration of a ball immediately prior to bouncing and immediately after bouncing on a table tennis table.

At step S124, the CPU 30A functions as the trajectory prediction section 32 in order to predict the velocity and rotational velocity of the ball BL immediately after bouncing on the table tennis table TB, based on the trajectory information for the predicted trajectory of the ball BL predicted at step S120. Specifically, as illustrated in FIG. 11, a velocity $v_1$ and a rotational velocity $\omega$ of the ball BL immediately after bouncing on the table tennis table TB are computed by inputting a velocity $v_0$ and a rotational velocity $w_0$ of the ball BL immediately prior to bouncing on the table tennis table TB into a table rebound model expressed by the following Equation.

$$v_1 = A_{vv}v_0 + A_{v\omega}\omega_0$$

$$\omega_1 = A_{\omega v}v_0 + A_{\omega\omega}\omega_0 \quad \text{Equation (10)}$$

$A_{vv}$, $A_{v\omega}$, $A_{\omega v}$, and $A_{\omega\omega}$, are expressed by the following Equations.

$$A_{vv} = \begin{bmatrix} 1-\alpha & 0 & 0 \\ 0 & 1-\alpha & 0 \\ 0 & 0 & -\eta \end{bmatrix} \quad \text{Equation (11)}$$

$$A_{v\omega} = \begin{bmatrix} 0 & \alpha*r & 0 \\ -\alpha*r & 0 & 0 \\ 0 & 0 & 0 \end{bmatrix} \quad \text{Equation (12)}$$

$$A_{\omega v} = \begin{bmatrix} 0 & \frac{-3\alpha}{2r} & 0 \\ \frac{3\alpha}{2r} & 0 & 0 \\ 0 & 0 & 0 \end{bmatrix} \quad \text{Equation (13)}$$

$$A_{\omega\omega} = \begin{bmatrix} 1-\frac{3\alpha}{2} & 0 & 0 \\ 0 & 1-\frac{3\alpha}{2} & 0 \\ 0 & 0 & 1 \end{bmatrix} \quad \text{Equation (14)}$$

Note that $\alpha$ is a preset parameter dependent on a friction coefficient between the table tennis table TB and the ball BL. $\eta$ is a preset rebound coefficient between the table tennis table TB and the ball BL.

A table rebound model expressed by the following Equations may also be employed.

$$\begin{cases} v_{1x} = v_{0x} - (1+\eta)\mu\cot\beta(v_{0x} - r\omega_{0y}) \\ v_{1y} = v_{0y} - (1+\eta)\mu\cot\beta(v_{0x} + r\omega_{0y}) \\ v_{1z} = -\eta v_{0z} \end{cases} \quad \text{Equation (15)}$$

$$\begin{cases} \omega_{1x} = \omega_{0x} - \frac{3(1+\eta)}{2r}\mu\cot\beta(v_{0y} + r\omega_{0x}) \\ \omega_{1y} = \omega_{0y} + \frac{3(1+\eta)}{2r}\mu\cot\beta(v_{0x} + r\omega_{0y}) \\ \omega_{1z} = \omega_{0z} \end{cases} \quad \text{Equation (16)}$$

$\beta$ is an angle formed between the ball BL and the table tennis table TB immediately prior to the ball BL bouncing on the table tennis table TB. Note that a table rebound model other than those described above may also be employed.

At step S126, the CPU 30A functions as the trajectory prediction section 32 in order to compute trajectory information for a predicted trajectory of the ball BL after bouncing on the table tennis table TB. Namely, the velocity $v_1$ and the rotational velocity $\omega_1$ of the ball BL immediately after bouncing on the table tennis table TB as computed at step S124 are input into aerodynamic Equation (1) a time evolution is run in order to compute the trajectory information for the predicted trajectory of the ball BL after bouncing on the table tennis table TB. The computed trajectory information is then output to the control device 50.

The control device 50 controls movement of the movable section 41 based on the trajectory information so as to return the ball BL. Specifically, the control device 50 controls the movable section 41 after deciding strike conditions including a position, an orientation, and a velocity of the racket RK based on the trajectory information so as to return the ball BL to a target arrival position.

The position of the racket RK at a time point when hitting back the ball BL for example corresponds to the highest position of the ball BL on its trajectory after the ball BL has bounced on the table tennis table TB. Alternatively, the position of the racket RK may be the lowest position within a height range in which the racket RK is capable of returning the ball BL, may be the position of the ball BL when the Z axis direction (height direction) velocity of the ball BL is at its slowest, or may be a position within a movement range of the robot 40 where return precision is a fixed value or greater.

Figure 12:
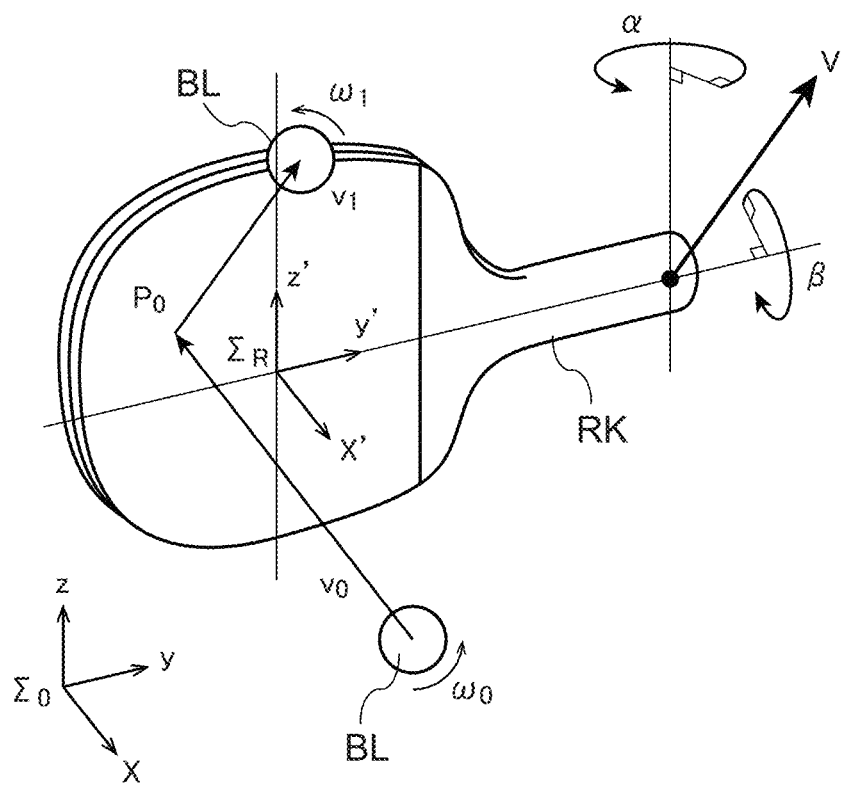
FIG. 12 is a diagram to explain velocity and angles of a racket.

The orientation of the racket RK is determined by the angles $\alpha$, $\beta$ illustrated in FIG. 12. FIG. 12 illustrates an example of the racket RK immediately prior to striking the ball BL and immediately after striking the ball BL. As illustrated in FIG. 12, the angle $\alpha$ is a rotation angle of the racket RK about a rotation axis running along the z' axis, and the angle $\beta$ is a rotation angle about a rotation axis running along the y' axis in a case in which a face of the racket RK lies in a z' axis-y' axis plane.

The orientation and velocity of the racket RK are decided such that error between a predicted arrival position computed from the trajectory information when the ball BL is hit back and the target arrival position is within a permitted range.

The control device 50 controls the movable section 41 so as to hit back the ball BL at the decided position, velocity, and angles $\alpha$, $\beta$ of the racket RK. The ball BL is thus hit back toward the vicinity of the target arrival position.

In this manner, in the present exemplary embodiment, the aerodynamic model is solved based on the measured position and the measured velocity of the ball BL at the first time point and on the provisional rotational velocity so as to perform processing to find the predicted position and the predicted velocity of the ball BL at the second time point that is later than the first time point for plural provisional rotational velocities, and so as to compute as the estimated rotational velocity either the provisional rotational velocity minimizing the difference between the predicted position at the second time point and the measured position at the second time point or the predicted rotational velocity at the second time point corresponding to the provisional rotational velocity minimizing the difference. This enables the rotational velocity of an incoming ball to be estimated using a simple configuration that does not require the use of a specialized ball, and also enables the trajectory of a ball applied with spin to be predicted with good position using a simple configuration.

Note that although in the present exemplary embodiment, explanation has been given regarding a configuration in which the state information computation section 24 is provided to the sensor section 20, the state information computation section 24 may be provided to the trajectory prediction device 30.

Note that although in the present exemplary embodiment, explanation has been given regarding a case in which the robot 40 that is the control target of the control device 50 is a real device, the control target of the control device 50 may be a robot that performs simulated actions.

Moreover, although in the present exemplary embodiment explanation has been given regarding a case in which the ball-returning robot 10 is a table tennis robot, there is no limitation thereto. For example, the ball-returning robot 10 may be applied to other ball-based sports and games, such as a tennis robot that hits back a tennis ball or a baseball robot that hits back a baseball ball with a bat. In the case of a baseball robot, for example application may be made so as to offer advice to a user regarding what type of stroke should be deployed to hit a pitched ball back to a target arrival position. Moreover, there is no limitation to a striking implement such as a racket being supported by the support section 42. For example, the leading end of the robot arm may be configured in the shape of a striking implement. The counter-striking implement is not limited to a table tennis racket as in the present exemplary embodiment, and may be configured by a tennis racket, a baseball bat, or the like.

Moreover, the trajectory prediction processing executed by the CPU reading software (a program) in the exemplary embodiment described above may be executed by various types of processor other than the CPU. Such processors include programmable logic devices (PLDs) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The trajectory prediction processing may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

Moreover, although the trajectory prediction program is stored in advance (installed) in the storage 30D or the ROM 30B in the exemplary embodiment described above, there is no limitation thereto. This program may be provided in a format recorded on a recording medium such as compact disc read only memory (CD-ROM), digital versatile disc read only memory (DVD-ROM), or universal serial bus (USB) memory. Alternatively, the program may be provided in a format downloadable from an external device over a network.

What is claimed is:

1. A trajectory prediction device, comprising:
    a rotation estimation device comprising:
        an acquisition section configured to acquire state information including a measured position and a measured velocity of an incoming ball, and
        a rotation estimation section configured to solve an aerodynamic model based on the measured position and the measured velocity of the ball at a first time point, and based on a provisional rotational velocity, so as to perform processing to find a predicted position and a predicted velocity of the ball at a second time point different from the first time point for a plurality of the provisional rotational velocities, and so as to compute, as an estimated rotational velocity, either the provisional rotational velocity minimizing a difference between the predicted position at the second time point and the measured position at the second time point or a predicted rotational velocity at the second time point corresponding to the provisional rotational velocity minimizing the difference,
    wherein the estimated rotational velocity is output to a trajectory prediction section of a trajectory prediction device, and
    wherein (i) if a number of acquisitions of measured positions and measured velocities is a predetermined threshold value or greater, the measured positions and the measured velocities of the acquired time series are corrected by using a quadratic function that approximates the measured positions and the measured velocities of the acquired time series, and
    (ii) if a number of acquisitions of measured positions and measured velocities is below the predetermined threshold value, the measured positions and the measured velocities of the acquired time series are corrected by using a linear function that approximates the measured positions and the measured velocities of the acquired time series; and
    a trajectory prediction section configured to solve an aerodynamic model based on the measured position, the measured velocity, and the estimated rotational velocity at a given time point so as to predict a trajectory of the ball from the given time point onward, wherein the trajectory of the ball is output to a control device of a ball-returning robot.

2. The trajectory prediction device of claim 1, wherein the trajectory prediction section is further configured to solve a rebound model in a case in which the ball lands so as to predict a trajectory of the ball after landing.

3. A trajectory prediction method, comprising:
    employing a rotation estimation method to acquire state information including a measured position and a measured velocity of an incoming ball and to compute an estimated rotational velocity of the ball, the rotation estimation method comprising:
        solving an aerodynamic model based on the measured position and the measured velocity of the ball at a first time point and based on a provisional rotational velocity so as to perform processing to find a predicted position and a predicted velocity of the ball at a second time point different from the first time point for a plurality of the provisional rotational velocities, and so as to compute, as the estimated rotational velocity, either the provisional rotational velocity minimizing a difference between the predicted position at the second time point and the measured position at the second time point or a predicted rotational velocity at the second time point corresponding to the provisional rotational velocity minimizing the difference, wherein the estimated rotational velocity is output to a trajectory prediction section of a trajectory prediction device, and wherein (i) if a number of acquisitions of measured positions and measured velocities is a predetermined threshold value or greater, the measured positions and the measured velocities of the acquired time series are corrected by using a quadratic function that approximates the measured positions and the measured velocities of the acquired time series, and (ii) if a number of acquisitions of measured positions and measured velocities is below the predetermined threshold value, the measured positions and the measured velocities of the acquired time series are corrected by using a linear function that approximates the measured positions and the measured velocities of the acquired time series; and solving an aerodynamic model based on the measured position, the measured velocity, and the estimated rotational velocity at a given time point so as to predict a trajectory of the ball from the given time point onward, wherein the trajectory of the ball is output to a control device of a ball-returning robot.

4. A non-transitory recording medium storing a trajectory prediction program that is executable by a computer to perform processing, the processing comprising:

executing a rotation estimation program so as to acquire state information including a measured position and a measured velocity of an incoming ball and to compute an estimated rotational velocity of the ball, execution of the rotation estimation program comprising:

solving an aerodynamic model based on the measured position and the measured velocity of the ball at a first time point and based on a provisional rotational velocity so as to perform processing to find a predicted position and a predicted velocity of the ball at a second time point different from the first time point for a plurality of the provisional rotational velocities, and so as to compute, as the estimated rotational velocity, either the provisional rotational velocity minimizing a difference between the predicted position at the second time point and the measured position at the second time point or a predicted rotational velocity at the second time point corresponding to the provisional rotational velocity minimizing the difference, wherein the estimated rotational velocity is output to a trajectory prediction section of a trajectory prediction device, and wherein (i) if a number of acquisitions of measured positions and measured velocities is a predetermined threshold value or greater, the measured positions and the measured velocities of the acquired time series are corrected by using a quadratic function that approximates the measured positions and the measured velocities of the acquired time series, and (ii) if a number of acquisitions of measured positions and measured velocities is below the predetermined threshold value, the measured positions and the measured velocities of the acquired time series are corrected by using a linear function that approximates the measured positions and the measured velocities of the acquired time series; and solving an aerodynamic model based on the measured position, the measured velocity, and the estimated rotational velocity at a given time point so as to predict a trajectory of the ball from the given time point onward, wherein the trajectory of the ball is output to a control device of a ball-returning robot.

5. A ball-returning robot, comprising:

the trajectory prediction device of claim 1;

a ball-returning striking implement configured to hit back an incoming ball;

a movable section configured to support the ball-returning striking implement so as to allow the ball-returning striking implement to be moved; and a control device configured to control movement of the movable section so as to return the ball based on a trajectory of the ball predicted by the trajectory prediction device.

6. A ball-returning robot, comprising:

the trajectory prediction device of claim 2;

a ball-returning striking implement configured to hit back an incoming ball;

a movable section configured to support the ball-returning striking implement so as to allow the ball-returning striking implement to be moved; and a control device configured to control movement of the movable section so as to return the ball based on a trajectory of the ball predicted by the trajectory prediction device.

* * * * *